(12) United States Patent
Yamasaki et al.

(10) Patent No.: US 8,899,391 B2
(45) Date of Patent: Dec. 2, 2014

(54) SHOCK ABSORBER

(75) Inventors: Jin Yamasaki, Ayase (JP); Shinichi Kagawa, Ayase (JP); Tetsuo Yoshida, Kawasaki (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 148 days.

(21) Appl. No.: 13/246,284

(22) Filed: Sep. 27, 2011

(65) Prior Publication Data

US 2012/0073920 A1    Mar. 29, 2012

(30) Foreign Application Priority Data

Sep. 29, 2010  (JP) ................................. 2010-218961

(51) Int. Cl.
| | | |
|---|---|---|
| *F16F 9/54* | (2006.01) | |
| *F16F 9/50* | (2006.01) | |
| *F16F 9/18* | (2006.01) | |
| *F16F 9/46* | (2006.01) | |
| *B60G 17/08* | (2006.01) | |
| *F16F 9/32* | (2006.01) | |
| *F16F 9/34* | (2006.01) | |
| *F16F 9/48* | (2006.01) | |

(52) U.S. Cl.
CPC . *B60G 17/08* (2013.01); *F16F 9/50* (2013.01); *F16F 9/18* (2013.01); *F16F 9/46* (2013.01); *F16F 9/32* (2013.01); *F16F 9/34* (2013.01); *F16F 9/48* (2013.01)
USPC ....................................... 188/322.2; 188/315

(58) Field of Classification Search
CPC ......... F16F 9/325; F16F 9/3257; F16F 9/341; F16F 9/062; F16F 9/064; F16F 9/369

USPC ............. 188/266.6, 286, 322.2, 322.13, 313, 188/315, 318, 322.16, 322.19
See application file for complete search history.

(56) References Cited

U.S. PATENT DOCUMENTS

| | | | | |
|---|---|---|---|---|
| 5,901,820 A | * | 5/1999 | Kashiwagi et al. | ........ 188/266.6 |
| 6,119,829 A | * | 9/2000 | Nakadate | .................. 188/266.6 |
| 6,427,986 B1 | * | 8/2002 | Sakai et al. | ................ 267/64.15 |
| 8,469,162 B2 | * | 6/2013 | Nishimura et al. | ........ 188/266.2 |
| 2012/0048666 A1 | * | 3/2012 | Murakami | .................... 188/315 |

FOREIGN PATENT DOCUMENTS

JP          9-264364          10/1997

* cited by examiner

*Primary Examiner* — Bradley King
*Assistant Examiner* — Nicholas J Lane
(74) *Attorney, Agent, or Firm* — Wenderoth, Lind & Ponack, LLP

(57) ABSTRACT

A flow of hydraulic oil induced by sliding movement of a piston in a cylinder is controlled by a pilot-type main valve and a pilot valve, which is a pressure control valve, to generate a damping force. The pilot valve is adjusted in its valve-opening pressure with the thrust of a solenoid and adjusts the pressure in a back pressure chamber to control the valve-opening pressure of the main valve. A baffle plate is provided in a reservoir to isolate the surface of hydraulic oil in the reservoir from an inlet port through which the hydraulic oil flows into the reservoir from a damping force generating mechanism, thereby suppressing the occurrence of aeration and cavitation. The baffle plate is secured by inserting a connecting port through a positioning opening and holding a separator tube with a pair of arm portions.

20 Claims, 12 Drawing Sheets

SHOCK ABSORBER

The present application claims priority under 35 U.S.C. section 119 to Japanese Patent Application No. 2010-218961 filed on Sep. 29, 2010.

The entire disclosure of Japanese Patent Application No. 2010-218961 filed on Sep. 29, 2010 including the specification, claims, drawings and summary is incorporated herein by reference in its entirety.

BACKGROUND OF THE INVENTION

The present invention relates to shock absorbers that generate a damping force by controlling the flow of a hydraulic fluid in relation to the stroke of a piston rod.

Cylinder type hydraulic shock absorbers attached to suspension systems of vehicles, for example, automobiles, are generally arranged as follows. A piston connected with a piston rod is inserted in a cylinder having a hydraulic oil therein as a hydraulic fluid. A stroke of the piston rod causes sliding movement of the piston in the cylinder, which in turn induces a flow of hydraulic oil. The hydraulic oil flow is controlled by a damping force generating mechanism, which comprises an orifice, a disk valve, etc., to generate a damping force. In some shock absorbers of this type, a reservoir having the hydraulic oil and a gas sealed therein is connected to the cylinder to compensate for a cubic capacity change in the cylinder caused by the entry and exiting of the piston rod into and from the cylinder and a volumetric change of hydraulic oil due to a temperature change. That is, such a cubic capacity change and a volumetric change are compensated for by the compression and expansion of the gas in the reservoir.

In a shock absorber having a reservoir as stated above, if the gas in the reservoir gets mixed into the hydraulic oil as bubbles or dissolves in the hydraulic oil, aeration or cavitation may occur, causing the damping force to become unstable. Under these circumstances, Japanese Patent Application Publication No. Hei 9-264364 discloses a shock absorber having a baffle plate disposed above an opening of a flow path of hydraulic oil in the reservoir. With this structure, the baffle plate isolates the opening of the hydraulic oil flow path from the oil surface in the reservoir and allows the flow path area of hydraulic oil flowing into the reservoir to be enlarged gradually. Accordingly, it is possible to suppress the gas in the reservoir from getting mixed into the hydraulic oil as bubbles or from dissolving in the hydraulic oil and hence possible to suppress the occurrence of cavitation and aeration.

SUMMARY OF THE INVENTION

An object of the present invention is to provide a shock absorber designed to enable a baffle plate to be positioned easily.

To solve the above-described problem, the present invention provides a shock absorber configured to be mounted between two members movable relative to each other. The shock absorber includes a cylinder having a hydraulic liquid sealed therein, a piston inserted in the cylinder, a piston rod connected to the piston and extending to the outside of the cylinder, an outer tube provided around the outer periphery of the cylinder, a reservoir formed between the cylinder and the outer tube and having the hydraulic liquid and a gas sealed therein, a connecting tube connected to the interior of the cylinder and extending to the outside of the outer tube, and an inlet port provided on the outer tube to allow the hydraulic liquid to flow therethrough into the reservoir from the outside of the outer tube. The reservoir is provided therein with a partition member having a partition that limits an upward flow of hydraulic liquid from the inlet port in the shock absorber with the shock absorber being mounted between the two members. The partition member has a restraint portion restraining the partition member to a part of the connecting tube that extends toward the outside.

DETAILED DESCRIPTION OF THE INVENTION

Embodiments of the present invention will be explained below in detail with reference to the accompanying drawings.

A first embodiment of the present invention will be explained with reference to FIGS. 1 to 5.

Figure 1:
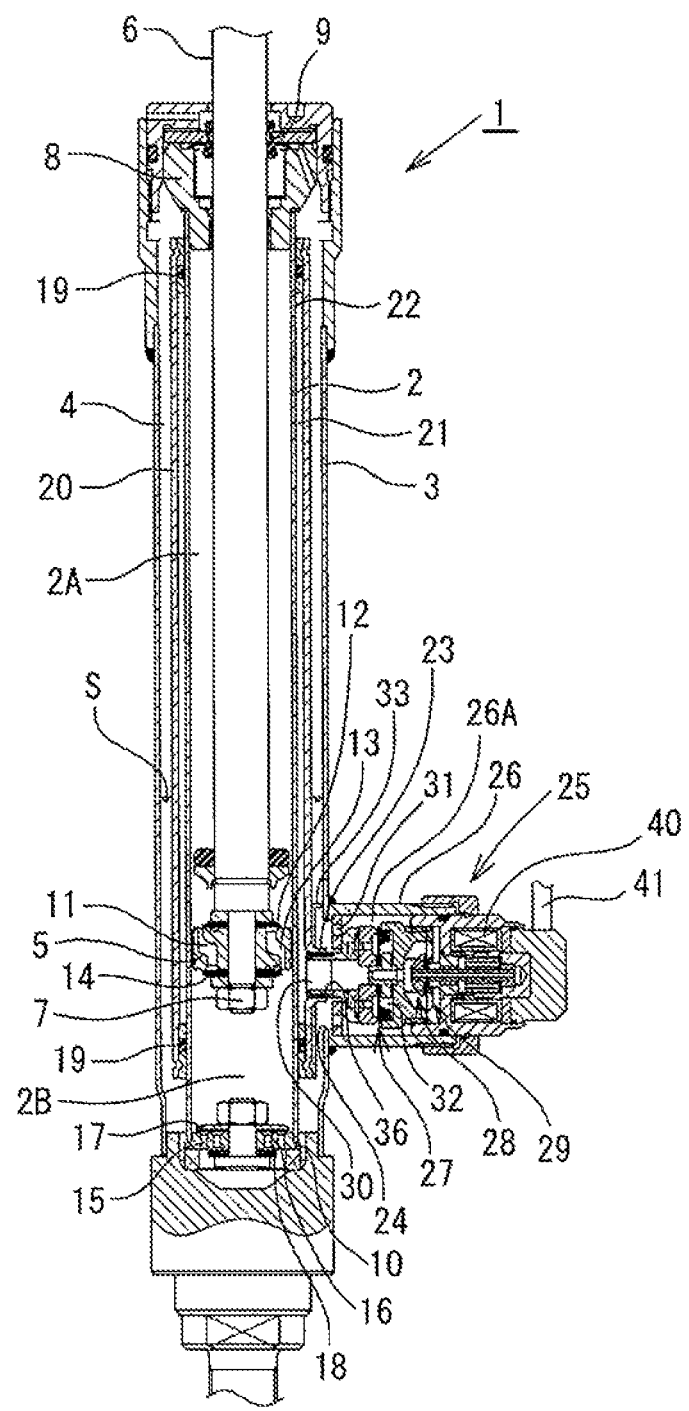
FIG. 1 is a vertical sectional view of a shock absorber according to a first embodiment of the present invention.
Figure 2:
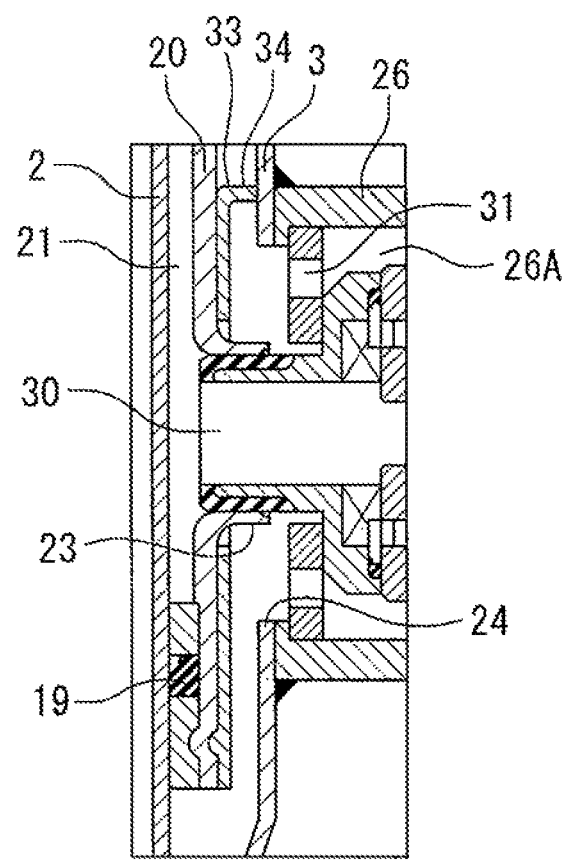
FIG. 2 is an enlarged vertical sectional view showing a main part of the shock absorber in FIG. 1.

As shown in FIGS. 1 and 2, a shock absorber 1 according to this embodiment is a tube-type damping force control hydraulic shock absorber having a double-tube structure comprising a cylinder 2 and an outer tube 3 provided around the outer periphery of the cylinder 2. An annular reservoir 4 is formed between the cylinder 2 and the outer tube 3. A piston 5 is slidably fitted in the cylinder 2. The piston 5 divides the interior of the cylinder 2 into two chambers, i.e. a cylinder upper chamber 2A and a cylinder lower chamber 2B. The piston 5 is connected with one end of a piston rod 6 by a nut 7. The other end of the piston rod 6 extends through the cylinder upper chamber 2A and through a rod guide 8 and an oil seal 9, which are provided in the upper end of the double-tube structure comprising the cylinder 2 and the outer tube 3. The other end of the piston rod 6 extends to the outside of the cylinder 2. A base valve 10 is provided in the lower end of the cylinder 2 to divide the cylinder lower chamber 2B and the reservoir 4 from each other.

The piston 5 is provided with passages 11 and 12 communicating between the cylinder upper and lower chambers 2A and 2B. The passage 12 is provided with a check valve 13 allowing only the flow of fluid from the cylinder lower chamber 2B toward the cylinder upper chamber 2A. The passage 11 is provided with a disk valve 14 that opens when the fluid pressure in the cylinder upper chamber 2A reaches a predetermined pressure to relieve the pressure to the cylinder lower chamber 2B.

The base valve 10 is provided with passages 15 and 16 communicating between the cylinder lower chamber 2B and the reservoir 4. The passage 15 is provided with a check valve 17 allowing only the flow of fluid from the reservoir 4 toward the cylinder lower chamber 2B. The passage 16 is provided with a disk valve 18 that opens when the fluid pressure in the cylinder lower chamber 2B reaches a predetermined pressure to relieve the pressure to the reservoir 4. As a hydraulic fluid, the cylinder 2 has a hydraulic oil (hydraulic liquid) sealed therein, and the reservoir 4 has the hydraulic oil and a gas sealed therein.

The cylinder 2 has a separator tube 20 as a connecting tube fitted thereover with seal members 19 interposed therebetween at the upper and lower ends of the cylinder 2. An annular passage 21 is formed between the cylinder 2 and the separator tube 20. The annular passage 21 is communicated with the cylinder upper chamber 2A through a passage 22 provided in a side wall of the cylinder 2 near the upper end thereof. The separator tube 20 has a small-diameter connecting port 23 projecting from a lower part of the side wall thereof. The side wall of the outer tube 3 is provided with a large-diameter inlet port 24 in substantially concentric relation to the connecting port 23. A damping force generating mechanism 25 is attached to the side wall of the outer tube 3 at the position of the inlet port 24. The connecting port 23 constitutes a part of the connecting tube that extends toward the outside of the outer tube 3 in the present invention. The distal end of connecting tube only needs to extend toward the outside of the outer tube 3 but need not extend from the inlet port 24 to the outside of the outer tube 3. The structure in which the connecting tube does not extend to the outside of the outer tube 3 allows an improvement in the operating efficiency of inserting the assembly of the cylinder 2 and the separator tube 20 into the outer tube 3.

The damping force generating mechanism 25 has a circular cylindrical casing 26 attached to the inlet port 24 of the outer tube 3. The casing 26 is provided therein with a pilot-type (back-pressure type) main valve 27 and a pilot valve 28 which is a solenoid-driven pressure control valve controlling the valve-opening pressure of the main valve 27. The damping force generating mechanism 25 further has a fail-safe valve 29 provided downstream of the pilot valve 28. The fail-safe valve 29 operates when there is a failure. The hydraulic oil is introduced through an inlet passage 30 connected to the connecting port 23 to flow into a chamber 26A surrounded by the casing 26 through the main valve 27, the pilot valve 28 and the fail-safe valve 29. The hydraulic oil in the chamber 26A flows into the reservoir 4 through a passage 31 in an end portion of the casing 26 and through the inlet port 24 of the outer tube 3.

Before the main valve 27 opens, the pilot valve 28 controls the flow of hydraulic oil to generate a damping force. When open, the main valve 27 mainly generates a damping force. In addition, a part of the hydraulic oil at the upstream side of the pilot valve 28 is introduced into a back pressure chamber 32 at the rear of the main valve 27, and the pressure in the back pressure chamber 32 is applied to the main valve 27 in the direction for closing the main valve 27.

The damping force can be controlled by adjusting the control pressure of the pilot valve 28 with an electric current supplied to a solenoid 40 through a lead wire 41. The adjustment of the control pressure of the pilot valve 28 results in a change in the pressure in the back pressure chamber 32, thus making it possible to control the valve-opening pressure and the degree of opening of the main valve 27.

The fail-safe valve 29 closes when the solenoid 40 fails. Thus, the fail-safe valve 29 restricts the flow of hydraulic oil in place of the pilot valve 28, which is now normally open, thereby preventing an excessive reduction of damping force and maintaining a moderate damping force.

In the reservoir 4, a baffle plate 33 serving as a partition member is attached to the outer peripheral surface of the separator tube 20 at a position facing the inlet port 24 of the outer tube 3.

Figure 3:
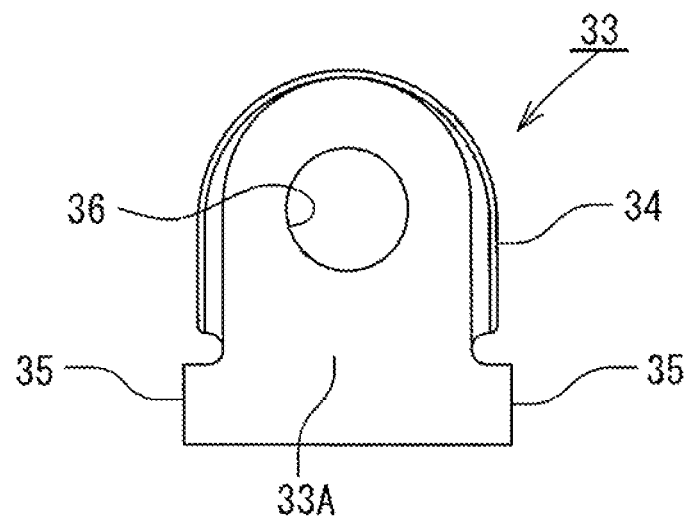
FIG. 3 is a front view of a baffle plate attached to the shock absorber shown in FIG. 1.
Figure 4:
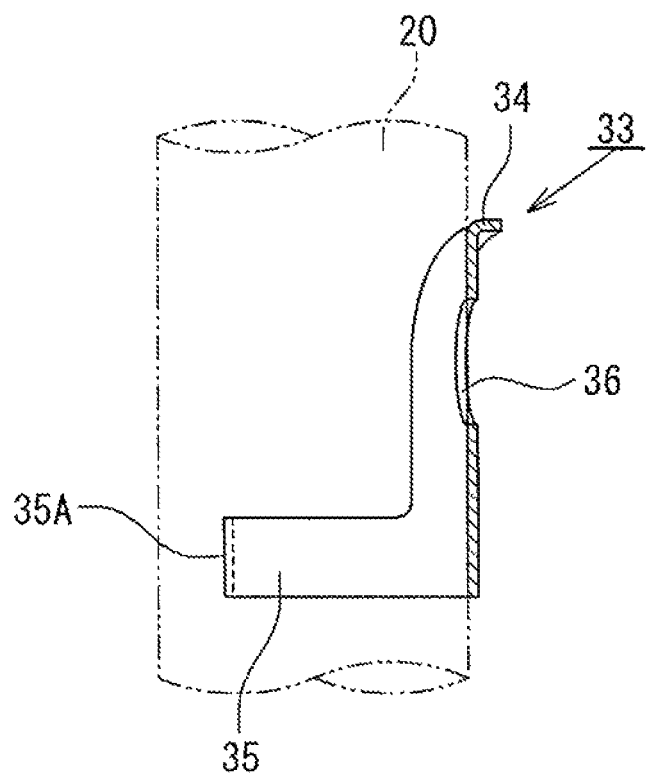
FIG. 4 is a vertical sectional view of the baffle plate shown in FIG. 3.
Figure 5:
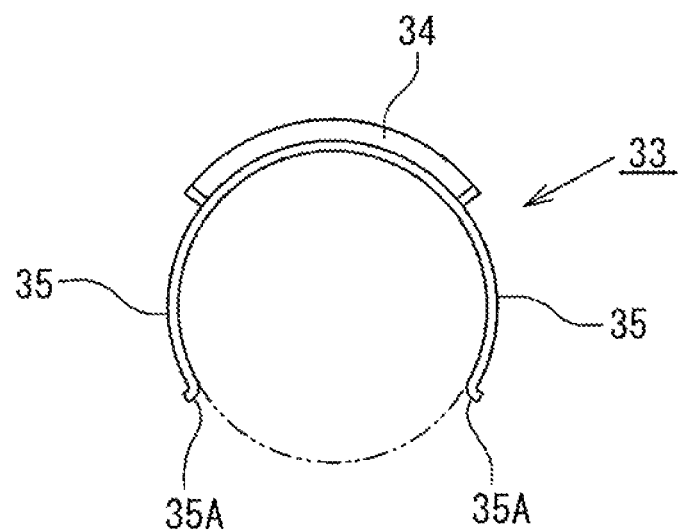
FIG. 5 is a bottom view of the baffle plate shown in FIG. 3.

As shown in FIGS. 3 to 5, the baffle plate 33 has a plate portion 33A in the shape of a plate curved along the outer peripheral surface of the separator tube 20 and a pair of arm portions 35 extending from the lower end of the plate portion 33A curvedly along the outer peripheral surface of the separator tube 20. The plate portion 33A and the pair of arm portions 35 are integrally formed together.

The plate portion 33A has a semicircular upper part that is semicircular as seen from the front side (FIG. 3; the same shall apply hereinafter) and a rectangular lower part extending downward from the upper part.

In the present invention, the plate portion 33A is curved along the cylinder 2. In this regard, if a tubular member, e.g. the separator tube 20, is provided around the outer periphery of the cylinder 2 as in this embodiment, the plate portion 33A is curved along the tubular member, which is equivalent to the plate portion 33A being curved along the cylinder 2.

The plate portion 33A of the baffle plate 33 has a partition 34 formed as an integral part thereof. The partition 34 is formed by folding the outer edge of the plate portion 33A at right angles to and toward the inner peripheral surface of the outer tube 3 over from the outer periphery of the semicircular upper part to the left and right ends of the rectangular lower part. Thus, the partition 34 is formed integrally with the plate portion 33A.

The rectangular lower part has a lower end portion where no partition 34 is formed. The pair of arm portions 35 is integrally formed with the lower end portion at the left and right sides thereof. The arm portions 35 extend along the outer peripheral surface of the separator tube 20 through at least over a half of the circumference of the separator tube 20. The distal ends 35A of the arm portions 35 are curved outwardly away from each other so that the baffle plate 33 can be readily fitted to the separator tube 20. The plate portion 33A of the baffle plate 33 is provided with a positioning opening 36 through which the connecting port 23 of the separator tube 20 is inserted. The positioning opening 36 is formed extending over from the semicircular upper part to the rectangular lower part, which extends downward from the upper part.

The baffle plate 33 has the connecting port 23 of the separator tube 20 inserted through the positioning opening 36 so as to stick firmly to the outer peripheral surface of the separator tube 20. In this state, the baffle plate 33 elastically holds the separator tube 20 with the pair of arm portions 35, thereby being secured to the separator tube 20.

It should be noted that, in the present invention, the pair of arm portions 35 holds the outer periphery of the cylinder 2. In this regard, if a tubular member, e.g. the separator tube 20, is provided around the outer periphery of the cylinder 2 as in this embodiment, the arm portions 35 hold the tubular member, and this is equivalent to that arm portions 35 holding the outer periphery of the cylinder 2.

The baffle plate 33 is formed so that the outer diameter of the semicircular upper part (inner diameter of the partition 34) is slightly larger than the inner diameter of the inlet port 24 of the outer tube 3, and that, when the baffle plate 33 is secured to the separator tube 20, the whole partition 34 is in contact with or in close proximity to the inner peripheral surface of the outer tube 3. The baffle plate 33 may, however, be formed so that the partition 34 is partially in contact with or in close proximity to the inner peripheral surface of the outer tube 3.

It should be noted that the baffle plate 33 can be integrally formed easily, for example, by pressing a metallic plate material, or molding a synthetic resin material, but may be produced by other publicly known methods. Alternatively, the baffle plate 33 may be produced by assembling a plurality of members.

The following is an explanation of the operation of this embodiment arranged as stated above.

The shock absorber 1 is mounted or installed between two members movable relative to each other, e.g. a sprung member (vehicle body-side member) and an unsprung member (wheel-side member) of a suspension system of a vehicle, with the piston rod 6 side facing up, and the base valve 10 side facing down. The lead wire 41 is connected to a controller.

During the extension stroke of the piston rod 6, the movement of the piston 5 in the cylinder 2 closes the check valve 13 of the piston 5. Before the disk valve 14 opens, the fluid in the cylinder upper chamber 2A is pressurized to flow through the passage 22 and the annular passage 21 into the inlet passage 30 of the damping force generating mechanism 25 from the connecting port 23 of the separator tube 20. The fluid flowing through the inlet passage 30 passes through the main valve 27, the pilot valve 28 and the fail-safe valve 29 to flow into the chamber 26A surrounded by the casing 26 and further passes through the passage 31 in the end portion of the casing 26 and through the inlet port 24 of the outer tube 3 to flow into the reservoir 4.

At this time, an amount of fluid corresponding to the amount of movement of the piston 5 flows into the cylinder lower chamber 2B from the reservoir 4 by opening the check valve 17 of the base valve 10. It should be noted that when the pressure in the cylinder upper chamber 2A reaches the valve-opening pressure of the disk valve 14 of the piston 5, the disk valve 14 opens to relieve the pressure in the cylinder upper chamber 2A into the cylinder lower chamber 2B, thereby preventing an excessive rise in pressure in the cylinder upper chamber 2A.

During the compression stroke of the piston rod 6, the movement of the piston 5 in the cylinder 2 opens the check valve 13 of the piston 5 and closes the check valve 17 for the passage 15 of the base valve 10. Before the disk valve 18 opens, the fluid in the cylinder lower chamber 2B flows into the cylinder upper chamber 2A, and an amount of fluid corresponding to the amount by which the piston rod 6 enters the cylinder 2 flows from the cylinder upper chamber 2A into the reservoir 4 through a flow path similar to that during the above-described extension stroke. It should be noted that when the pressure in the cylinder lower chamber 2B reaches the valve-opening pressure of the disk valve 18 of the base valve 10, the disk valve 18 opens to relieve the pressure in the cylinder lower chamber 2B into the reservoir 4, thereby preventing an excessive rise in pressure in the cylinder lower chamber 2B.

Thus, during both the extension and compression strokes of the piston rod 6, before the main valve 27 opens (in the low piston speed region) in the damping force generating mechanism 25, the pilot valve 28 generates a damping force. After the main valve 27 has opened (in the high piston speed region), the main valve 27 generates a damping force according to the degree of opening thereof. The damping force can be controlled by adjusting the control pressure of the pilot valve 28 with an electric current supplied to the solenoid 40. The adjustment of the control pressure of the pilot valve 28 results in a change in the pressure in the back pressure chamber 32, thus making it possible to control the valve-opening pressure and the degree of opening of the main valve 27. If the solenoid 40 should fail, the fail-safe valve 29 closes to restrict the flow of hydraulic oil in place of the pilot valve 28, which is now normally open, thereby preventing an excessive reduction of damping force and maintaining a moderate damping force.

With the baffle plate 33 provided as stated above, a part of the shock absorber 1 at which the hydraulic oil flows into the reservoir 4 from the damping force generating mechanism 25 through the passage 31 and the inlet port 24 of the outer tube 3 is isolated from the surface S of hydraulic oil in the reservoir 4 by the partition 34 of the baffle plate 33. Thus, the baffle plate 33 limits or regulates an upward flow of hydraulic oil in the reservoir 4 of the shock absorber 1 as used when the hydraulic oil flows into the reservoir 4 from the damping force generating mechanism 25 through the passage 31 and the inlet port 24 of the outer tube 3. Accordingly, it is possible to prevent the generation of vortexes and bubbles in the neighborhood of the oil surface S which would otherwise be caused by a jet of hydraulic oil flowing into the reservoir 4 through the inlet port 24. Thus, it is possible to suppress the gas from dissolving in the hydraulic oil and to make it difficult for aeration and cavitation to occur. Consequently, a stable damping force can be obtained.

In the above expression "an upward flow of hydraulic oil in the reservoir 4 of the shock absorber 1 as used", the term "upward" represents a direction determined by the way in which the shock absorber 1 is mounted or installed between, for example, a vehicle body and a wheel. That is, the shock absorber in this embodiment is an upright type in which the piston rod 6 projects upward from the upper end of the shock absorber. Therefore, the direction in which the piston rod 6 projects is upward. In an inverted type shock absorber in which the piston rod projects downward from the shock absorber, the direction toward the bottom of the shock absorber is upward.

In addition, the baffle plate 33 eases the rapid enlargement of the flow path area of hydraulic oil flowing into the reservoir 4 from the damping force generating mechanism 25. Therefore, it is possible to relieve the rapid increase in flow velocity of hydraulic oil when flowing into the reservoir 4. Consequently, it is possible to suppress the generation of bubbles accompanying the generation of vortexes and to suppress the gas from dissolving in the hydraulic oil. Thus, it is possible to make it difficult for aeration and cavitation to occur and hence possible to obtain a stable damping force.

To mount or install the baffle plate 33, the connecting port 23 of the separator tube 20 is inserted through the positioning opening 36 to position the baffle plate 33 relative to the separator tube 20, and the separator tube 20 is pushed in between the outwardly curved distal ends 35A of the pair of arm portions 35, thereby holding the separator tube 20 with the arm portions 35. In this way, the baffle plate 33 can be readily attached to the outer periphery of the cylinder 2. Thus, this embodiment dispenses with a complicated process such as welding and is free from the problem of welding spatter getting mixed in the hydraulic oil. In addition, the baffle plate 33 can be integrally formed by pressing a plate material or by molding a resin material and thus can be manufactured easily.

When being assembled, the separator tube 20 may be inserted into the inner periphery of the outer tube 3 after the baffle plate 33 has been attached to the separator tube 20, with the connecting port 23 inserted through the positioning opening 36. Even in such a case, the baffle plate 33 will not be displaced either axially or radially because it has been positioned relative to the separator tube 20 through the positioning opening 36. Accordingly, it is possible to improve the assembly quality and to increase productivity.

In the foregoing first embodiment, an elastic seal member, e.g. rubber, may be attached to the distal end of the partition 34 of the baffle plate 33. With this structure, it is possible to improve sealing performance between the partition 34 and the inner peripheral surface of the outer tube 3 and to prevent irregular contact of the partition 34 with the outer tube 3 or the separator tube 20 which might otherwise be caused by vibration and hence possible to suppress the generation of noise. If rubber is attached to the distal end of the partition 34, the rubber and the outer tube 3 contact each other. Contact of the rubber with the outer tube 3 interferes with the movement of the partition 34 relative to the outer tube 3, which prevents irregular contact of the partition 34 with the separator tube 20. The elastic seal member may be attached to the partition 34 by a publicly known securing method, e.g. fitting, bonding, or baking.

Even if there is a small clearance between the distal end of the partition 34 of the baffle plate 33 and the inner peripheral surface of the outer tube 3, the advantageous effect of the baffle plate 33 can be obtained, provided that the upward flow of oil can be limited or regulated.

Figure 6:
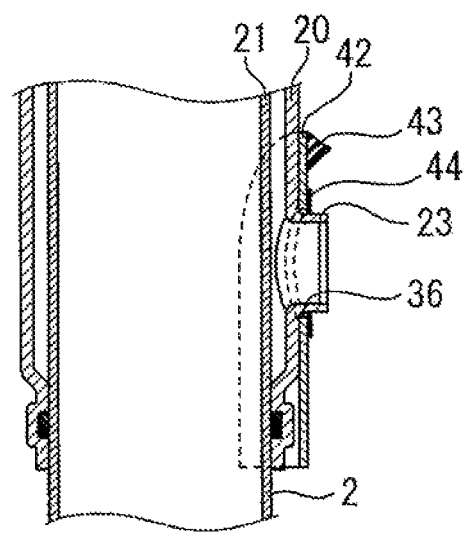
FIG. 6 is a vertical sectional side view showing a mounting portion of a baffle plate as a main part of a shock absorber according to a second embodiment of the present invention.
Figure 7:
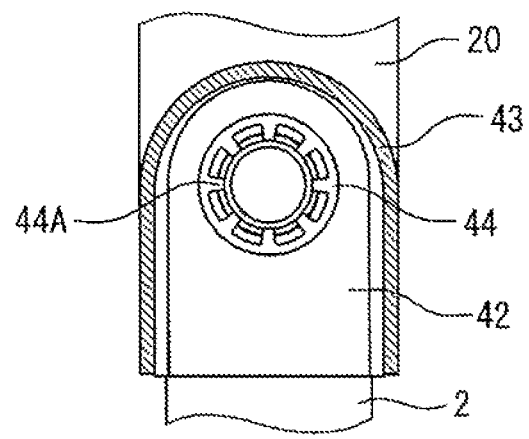
FIG. 7 is a front view of the mounting portion of the baffle plate shown in FIG. 6.
Figure 8:
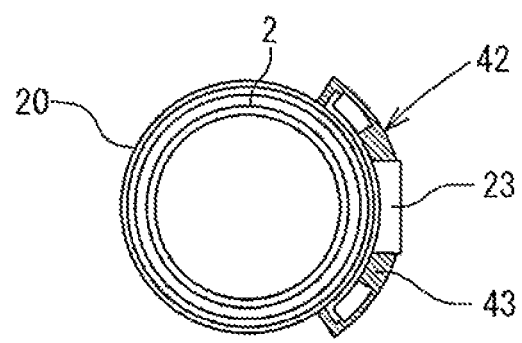
FIG. 8 is a bottom view of the mounting portion of the baffle plate shown in FIG. 6.
Figure 9:
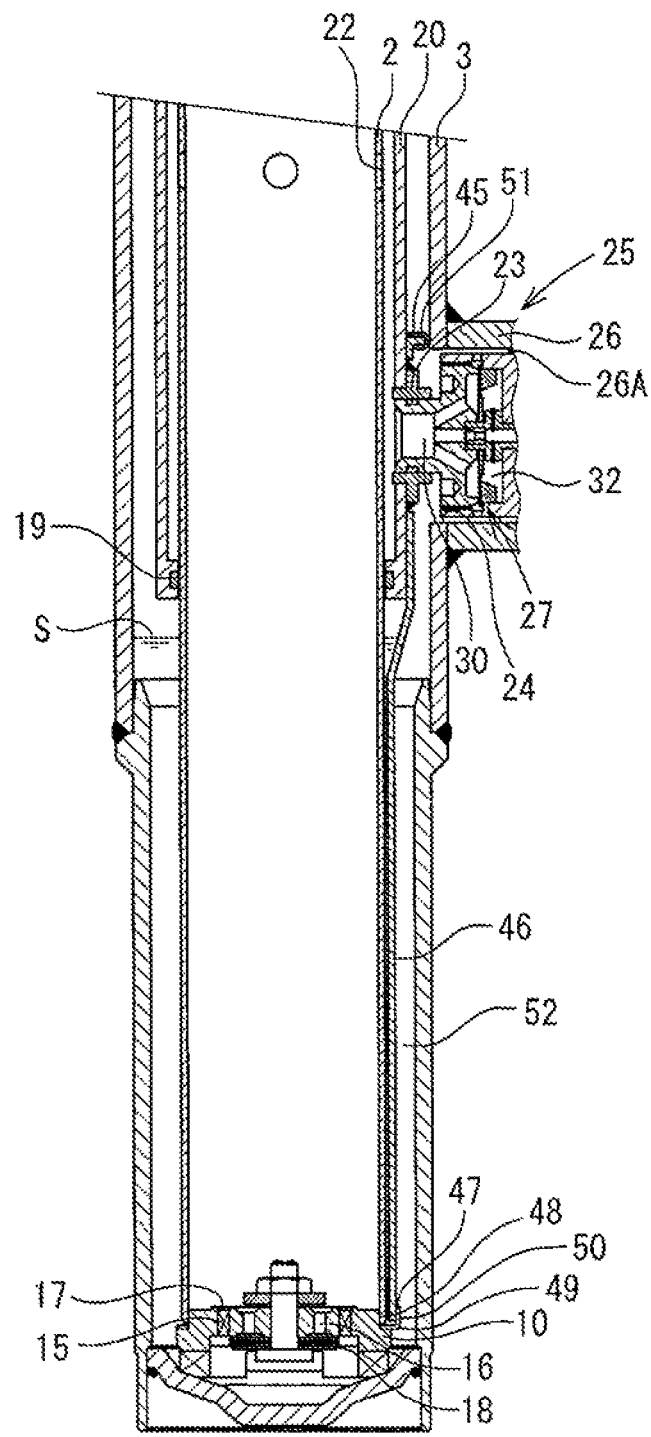
FIG. 9 is a vertical sectional side view showing a mounting portion of a baffle plate as a main part of a shock absorber according to a third embodiment of the present invention.
Figure 10:
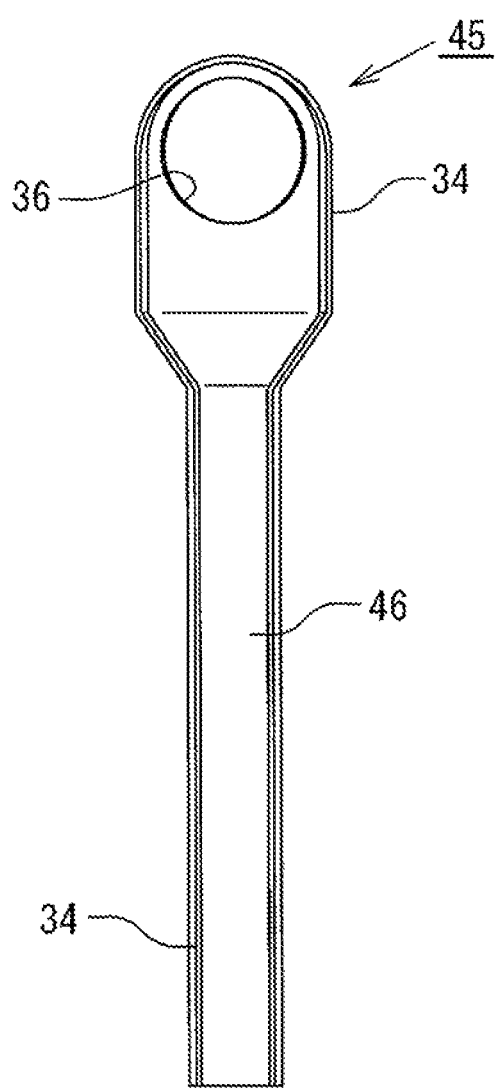
FIG. 10 is a front view of the baffle plate attached to the shock absorber shown in FIG. 9.
Figure 11:
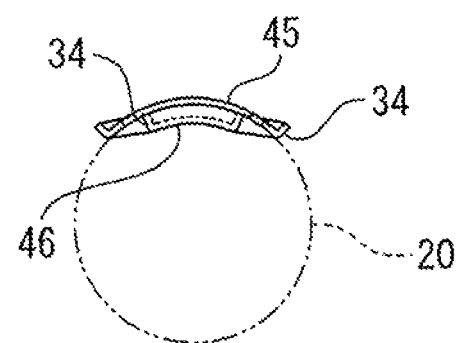
FIG. 11 is a plan view of the baffle plate shown in FIG. 10.
Figure 12:
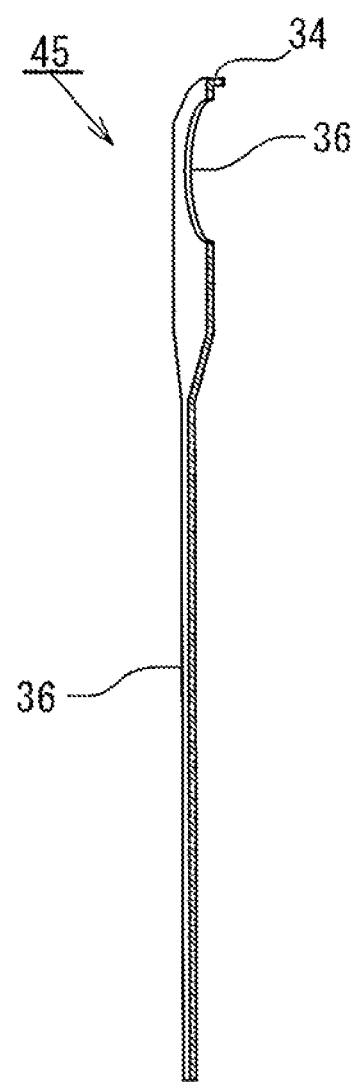
FIG. 12 is a vertical sectional side view of the baffle plate shown in FIG. 10.
Figure 13:
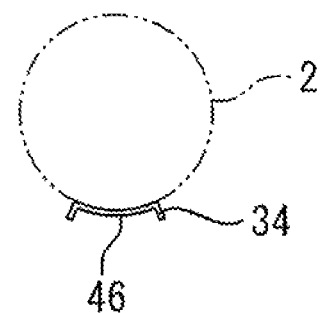
FIG. 13 is a bottom view of the baffle plate shown in FIG. 10.

Next, a second embodiment of the present invention will be explained with reference to FIGS. 6 to 8. It should be noted that FIGS. 6 to 8 show only a mounting portion of a baffle plate as a main part of a shock absorber according to this embodiment. In the second embodiment, members or portions similar to those of the foregoing first embodiment are denoted by the same reference numerals as those used in the first embodiment, and only the points in which the second embodiment differs from the first embodiment will be explained in detail.

Referring to FIGS. 6 to 8, the shock absorber of this embodiment includes a baffle plate 42 (plate portion) having a rubber partition member 43 as an elastic seal member secured thereto by baking. With this structure, the shock absorber of the second embodiment has improved sealing performance between the partition member 43 and the inner peripheral surface of the outer tube 3 and is capable of suppressing the generation of noise. The baffle plate 42 does not have a pair of arm portions 35. The baffle plate 42 is secured to the separator tube 20 by fitting a toothed washer 44 onto the connecting port 23 of the separator tube 20 inserted into the positioning opening 36. The toothed washer 44 has an integral structure comprising an annular spring member and a plurality of locking portions 44A extending radially from the inner periphery of the spring member. The locking portions 44A are bendable to allow the connecting port 23 to be press-fit into the toothed washer 44. After having been press-fitted into the toothed washer 44, the connecting port 23 cannot readily come out of it because of the wedge effect of the locking portions 44A. With this structure, the second embodiment can offer advantageous effects similar to those of the foregoing first embodiment.

The baffle plate 33 of the first embodiment is integrally formed with a pair of arm portions 35 extending along the outer peripheral surface of the separator tube 20 through at least over a half of the circumference of the separator tube 20. Accordingly, the arm portions 35 are expanded when fitted to the outer peripheral surface of the separator tube 20, which means that stress may be concentrated on the roots of the arm portions 35 during the fitting process. Some measures may have to be taken against the stress concentration; for example, increasing the width of the arm portions 35 in order to increase the rigidity thereof. This may give rise to the problem that the baffle plate 33 itself will increase in weight and size. In this regard, the baffle plate 42 of the second embodiment uses the toothed washer 44, which is discrete from the baffle plate 42. Therefore, if the mechanical strength needs to be increased, only the toothed washer 44 needs to increase in strength, and it is unnecessary to increase the overall strength of the baffle plate 42. Consequently, it is possible to reduce the total weight of the baffle plate 42 and the toothed washer 44.

In addition, the baffle plate 33 of the first embodiment is integrally formed with a pair of arm portions 35 extending along the outer peripheral surface of the separator tube 20 through at least over a half of the circumference of the separator tube 20, and the arm portions 35 expand when fitted to the outer peripheral surface of the separator tube 20. In contrast to this, the second embodiment only needs to press-fit the toothed washer 44 onto the connecting port 23 through a distance corresponding to the height of a part of the connecting port 23 that radially extends from the separator tube 20. Accordingly, the operating time can be reduced, and productivity can be increased.

In addition, the arm portions 35 of the first embodiment extend in a radial direction perpendicularly intersecting the axial direction of the separator tube 20. Therefore, the arm portions 35 may interfere with the flow of hydraulic oil flowing out of the inlet port 24. In this regard, the baffle plate 42 of the second embodiment has no part extending in the radial direction. Therefore, it is possible to smooth the flow of hydraulic oil.

Next, a third embodiment of the present invention will be explained with reference to FIGS. 9 to 13. It should be noted that FIGS. 9 to 13 show only a mounting portion of a baffle plate as a main part of a shock absorber according to this embodiment. In the third embodiment, members or portions similar to those of the foregoing first embodiment are denoted by the same reference numerals as those used in the first embodiment, and only the points in which the third embodiment differs from the first embodiment will be explained in detail.

In the shock absorber according to this embodiment, unlike in the first embodiment, the damping force generating mechanism 25 is disposed at a position closer to the upper end of the outer tube 3, and the separator tube 20 is reduced in length by an amount corresponding to a distance through which the damping force generating mechanism 25 is displaced upward. The separator tube 20 has a connecting port 23 discrete therefrom. The connecting port 23 is joined to the separator tube 20 by welding. The shock absorber of this embodiment has a baffle plate 45 with no arm portions 35. The baffle plate 45 has an extension 46 integrally formed with the rectangular lower part. The extension 46 extends axially downward from the rectangular lower part toward the lower end of the separator tube 20 as far as the outer peripheral edge of the base valve 10.

The extension 46 is offset radially inward so as to extend along the outer peripheral surface of the cylinder 2, which is disposed at the inner periphery of the separator tube 20. The extension 46 is narrower in width than the rectangular lower part and provided contiguously to the rectangular lower part through a trapezoidal portion. The extension 46 is curved at a curvature corresponding to that of the outer peripheral surface of the cylinder 2 so as to stick firmly to the outer peripheral surface of the cylinder 2. The partition 34 is extended axially downward together with the extension 46 and extended from the extension 46 at right angles thereto (radially outward of the cylinder 2) so that the distal end of the partition 34 contacts the inner peripheral surface of the outer tube 3.

The baffle plate 45 is secured by inserting the connecting port 23 through the positioning opening 36 and bringing the extension 46 into abutting contact with the outer peripheral surface of the cylinder 2 and further inserting the lower end of the extension 46 into a groove 47 provided in the base valve 10. The groove 47 is formed by folding an engaging portion 50 projecting radially outward from a ring-shaped member 49 fitted, together with the lower end of the cylinder 2, into a step portion 48 at the outer periphery of the base valve 10.

In addition, an elastic seal member 51 is attached to the distal end of the partition 34 to tightly seal between the partition 34 and the inner peripheral surface of the outer tube 3. Thus, a reservoir passage 52 (passage) is formed between the baffle plate 45 and the inner peripheral surface of the outer tube 3. The reservoir passage 52 communicates with the chamber 26A of the damping force generating mechanism 25 and opens into the lower end of the reservoir 4 at a position near the base valve 10.

With the above-described structure, the reservoir passage 52 enables the surface S of hydraulic oil in the reservoir 4 to be below the inlet port 24 of the outer tube 3, to which the damping force generating mechanism 25 is attached, and allows a reduction in the amount of hydraulic oil. Further, a part of the shock absorber at which the hydraulic oil flows into the reservoir 4 from the damping force generating mechanism 25 is isolated from the surface S of hydraulic oil in the reservoir 4. Therefore, it is possible to suppress the occurrence of aeration and cavitation and to obtain a stable damping force in the same way as in the first embodiment. The baffle plate 45 can be integrally formed by pressing a plate material or by molding a resin material and thus can be manufactured easily as in the case of the first embodiment.

Figure 14:
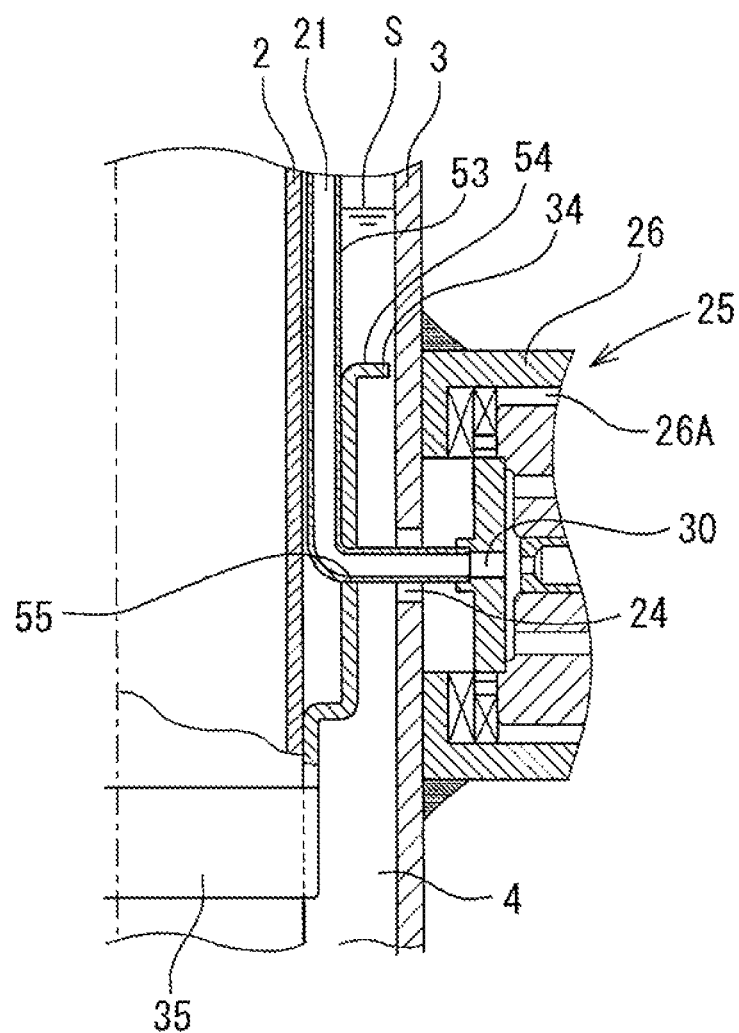
FIG. 14 is a vertical sectional side view showing a mounting portion of a baffle plate as a main part of a shock absorber according to a fourth embodiment of the present invention.

Next, a fourth embodiment of the present invention will be explained with reference to FIG. 14. It should be noted that FIG. 14 shows only a mounting portion of a baffle plate as a main part of a shock absorber according to this embodiment. In the fourth embodiment, members or portions similar to those of the foregoing first embodiment are denoted by the same reference numerals as those used in the first embodiment, and only the points in which the fourth embodiment differs from the first embodiment will be explained in detail.

In the shock absorber of this embodiment, a tubular pipe member 53 is provided as a connecting tube for communication between the cylinder upper chamber 2A and the inlet passage 30 of the damping force generating mechanism 25. The tubular pipe member 53 is connected at one end thereof to the passage 22 of the cylinder 2 and extended axially along the outer peripheral surface of the cylinder 2 before being bent radially outward and inserted through the inlet port 24 of the outer tube 3 and connected at the other end thereof to the inlet passage 30.

The shock absorber of this embodiment includes a baffle plate 54 having an upper end thereof offset radially outward. The tubular pipe member 53 is disposed between the upper part of the baffle plate 54 and the outer peripheral surface of the cylinder 2. The baffle plate 54 is provided with an opening 55 in place of the positioning opening 36. The opening 55 allows the tubular pipe member 53 to extend therethrough. The baffle plate 54 is attached to the outer periphery of the cylinder 2 by directly holding the cylinder 2 with a pair of arm portions 35.

With the above-described structure, a part of the shock absorber at which the hydraulic oil flows into the reservoir 4 from the damping force generating mechanism 25 can be isolated from the surface S of hydraulic oil in the reservoir 4. Therefore, it is possible to suppress the occurrence of aeration and cavitation and to obtain a stable damping force.

It should be noted that the foregoing first to fourth embodiments show an example in which neither bonding nor welding is used to attach the baffle plate to the outer periphery of the cylinder 2 from the viewpoint of reducing the number of man-hours needed to manufacture the shock absorber and also from a contamination point of view. With the structure of the present invention, however, the baffle plate may be attached to the cylinder (including the separator tube) by welding or bonding. In such a case, it is possible to obtain an advantageous effect that the connecting tube facilitates the positioning of the baffle plate.

Although in the foregoing first to fourth embodiments the opening 36 serving as a restraint portion is substantially equal in dimension to the connecting port 23, the opening 36 may have a clearance all around or may have an elliptical shape because the opening 36 only needs to be capable of roughly positioning the separator tube 20 when inserted into the outer tube 3. Although the connecting port 23 in this embodiment is circular in shape, it may also have an elliptical or quadrangular shape.

It should be noted that the foregoing embodiments show an example in which the inlet port and the connecting tube are coaxial with each other and the connecting tube is connected to the outside through the inlet port. In this regard, the part of the connecting tube that extends toward the outside and the inlet port may be displaced relative to each other to axially different parts, for example. The inlet port only needs to be configured so that fluid flows therethrough from the outside of the outer tube, and may therefore be a port through which fluid flows in and out according to the stroke of the piston rod of the shock absorber.

Although the foregoing embodiments show an example in which the inlet port and the connecting tube are connected to the external damping force generating mechanism 25, the present invention may also be used in, for example, a relative absorber system (REAS) in which the inlet port and the connecting tube are connected to a shock absorber provided for another wheel. The present invention may also be used in an active suspension in which the inlet port and the connecting tube are connected to a hydraulic pump or a reservoir tank.

The shock absorber according to each of the foregoing embodiments allows the baffle plate to be positioned easily.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

What is claimed is:

1. A shock absorber configured to be mounted between two relatively movable members, the shock absorber comprising:
    a cylinder having a hydraulic liquid sealed therein;
    a piston inserted in the cylinder;
    a piston rod connected to the piston and extending to an outside of the cylinder;
    an outer tube provided around an outer periphery of the cylinder;
    a reservoir formed between the cylinder and the outer tube and having the hydraulic liquid and a gas sealed therein;
    a connecting tube fitted over the cylinder, the connecting tube including an extending portion which extends radially away from the cylinder toward an outside of the outer tube; and an inlet port provided on the outer tube to allow the hydraulic liquid to flow therethrough into the reservoir from the outside of the outer tube;

wherein a plate-shaped partition member is provided in the reservoir, the partition member having a partition that limits an upward flow of the hydraulic liquid from the inlet port in the shock absorber when the shock absorber is mounted between the two relatively movable members;

wherein the partition member has an opening positioning the partition member to the connecting tube by an insertion of the extending portion of the connecting tube into the opening; and wherein the opening extends through the partition member in a direction of a wall thickness of the partition member.

2. The shock absorber of claim 1, wherein the partition member has:

a plate portion in a shape of a plate having the opening; and
an elastic member;

wherein when the shock absorber is mounted between the two relatively movable members, the elastic member is provided on at least an upper part of the plate portion in the shock absorber and contacts an inner peripheral surface of the outer tube to serve as the partition.

3. The shock absorber of claim 2, wherein the plate portion of the partition member is curved along the cylinder.

4. The shock absorber of claim 1, wherein the connecting tube includes a separator tube provided concentrically around the outer periphery of the cylinder between the cylinder and the outer tube, wherein an annular passage is formed between the cylinder and the separator tube, and wherein the annular passage is in communication with an inside of the cylinder.

5. The shock absorber of claim 4, wherein
the separator tube includes, at a side wall thereof, the extending portion which projects radially away from the cylinder, and the extending portion projects through the opening of the partition member and includes a connecting portion at a distal end thereof.

6. The shock absorber of claim 1, wherein the connecting tube extends to the outside of the outer tube through the inlet port.

7. The shock absorber of claim 1, wherein the partition member has a pair of arm portions integrally provided thereon to hold the outer periphery of the connecting tube.

8. The shock absorber of claim 1, wherein the connecting tube includes a tubular pipe member axially extending along an outer peripheral surface of the cylinder, and the tubular pipe member has a portion bent radially outward away from the cylinder to serve as the extending portion.

9. The shock absorber of claim 1, further comprising: a damping force generating mechanism disposed outside the outer tube, the damping force generating mechanism being connected to the extending portion of the connecting tube.

10. The shock absorber of claim 1, wherein the inlet port is located below a surface of the hydraulic liquid in the reservoir when the shock absorber is mounted between the two relatively movable members.

11. The shock absorber of claim 1, wherein the inlet port is located above a surface of the hydraulic liquid in the reservoir when the shock absorber is mounted between the two relatively movable members, wherein the inlet port opens into a passage formed by the partition member to allow the hydraulic liquid to flow through the inlet port.

12. The shock absorber of claim 1, wherein the partition member is a press-formed article.

13. The shock absorber of claim 1, wherein
the partition of the partition member that limits the upward flow of the hydraulic liquid from the inlet port is disposed above the extending portion when the shock absorber is mounted between the two relatively movable members.

14. The shock absorber of claim 5, wherein the partition member is attached to the separator tube with a washer secured to an outer periphery of the extending portion.

15. A shock absorber configured to be mounted between two relatively movable members, the shock absorber comprising:

a cylinder having a hydraulic liquid sealed therein;
a piston inserted in the cylinder;
a piston rod connected to the piston and extending to an outside of the cylinder;
an outer tube provided around an outer periphery of the cylinder;
a reservoir formed between the cylinder and the outer tube and having the hydraulic liquid and a gas sealed therein;
a connecting tube fitted over the cylinder, the connecting tube including an extending portion which extends toward an outside of the outer tube; and
an inlet port provided on the outer tube to allow the hydraulic liquid to flow therethrough into the reservoir from the outside of the outer tube;

wherein a partition member is provided in the reservoir, the partition member having a partition that limits an upward flow of the hydraulic liquid from the inlet port in the shock absorber when the shock absorber is mounted between the two relatively movable members;

wherein the partition member has an opening restraining the partition member to the extending portion of the connecting tube;

wherein the partition member has a plate portion in a shape of a plate having the opening and an elastic member; and wherein when the shock absorber is mounted between the two relatively movable members, the elastic member is provided on at least an upper part of the plate portion in the shock absorber and contacts an inner peripheral surface of the outer tube to serve as the partition.

16. The shock absorber of claim 15, wherein
the opening extends through the plate portion in a direction of a wall thickness of the plate portion, and
the extending portion of the connecting tube extends toward the outside of the outer tube and radially away from the cylinder.

17. The shock absorber of claim 15, wherein the plate portion of the partition member is curved along the cylinder.

18. The shock absorber of claim 15, wherein
the partition of the partition member that limits the upward flow of the hydraulic liquid from the inlet port is disposed above the extending portion when the shock absorber is mounted between the two relatively movable members.

19. A shock absorber configured to be mounted between two relatively movable members, the shock absorber comprising:

a cylinder having a hydraulic liquid sealed therein;
a piston inserted in the cylinder;
a piston rod connected to the piston and extending to an outside of the cylinder;
an outer tube provided around an outer periphery of the cylinder;

a reservoir formed between the cylinder and the outer tube and having the hydraulic liquid and a gas sealed therein;

a connecting tube fitted over the cylinder, the connecting tube including an extending portion which extends toward an outside of the outer tube; and an inlet port provided on the outer tube to allow the hydraulic liquid to flow therethrough into the reservoir from the outside of the outer tube;

wherein a partition member is provided in the reservoir, the partition member having a partition that limits an upward flow of the hydraulic liquid from the inlet port in the shock absorber when the shock absorber is mounted between the two relatively movable members;

wherein the partition member has an opening restraining the partition member to the extending portion of the connecting tube;

wherein the connecting tube includes a separator tube provided concentrically around the outer periphery of the cylinder;

wherein the separator tube includes the extending portion;

wherein the extending portion projects through the partition member and includes a connecting portion at a distal end thereof; and wherein the partition member is attached to the separator tube with a washer secured to an outer periphery of the extending portion.

20. The shock absorber of claim 19, wherein the partition member is in the shape of a plate, the opening extends through the plate portion in a direction of a wall thickness of the plate portion, and the extending portion of the connecting tube extends toward the outside of the outer tube and radially away from the cylinder.

* * * * *